United States Patent
Yun et al.

(10) Patent No.: US 9,444,845 B2
(45) Date of Patent: Sep. 13, 2016

(54) NETWORK SECURITY APPARATUS AND METHOD

(71) Applicant: ELECTRONICS AND TELECOMMUNICATIONS RESEARCH INSTITUTE, Daejeon (KR)

(72) Inventors: Jeong-Han Yun, Daejeon (KR); Heemin Kim, Daejeon (KR); Kyoung-Ho Kim, Gokseong-gun (KR); Woonyon Kim, Daejeon (KR); Byung-gil Min, Cheongju-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 41 days.

(21) Appl. No.: 14/277,360

(22) Filed: May 14, 2014

(65) Prior Publication Data
US 2014/0344888 A1  Nov. 20, 2014

(30) Foreign Application Priority Data

May 16, 2013  (KR) .................. 10-2013-0055549

(51) Int. Cl.
*H04L 29/06* (2006.01)
(52) U.S. Cl.
CPC ........... *H04L 63/20* (2013.01); *H04L 63/1408* (2013.01)
(58) Field of Classification Search
CPC ....................................... G06F 21/50
USPC ............................... 726/22, 23, 24
See application file for complete search history.

(56) References Cited

U.S. PATENT DOCUMENTS

| | | | |
|---|---|---|---|
| 7,032,022 B1* | 4/2006 | Shanumgam et al. ........ 709/225 |
| 2004/0187033 A1* | 9/2004 | Wang .................. H04L 63/0209 726/13 |

(Continued)

FOREIGN PATENT DOCUMENTS

| KR | 10-2003-0016500 A | 3/2003 |
| KR | 10-2007-0008804 A | 1/2007 |

(Continued)

OTHER PUBLICATIONS

Jinho Park et al., "A Design and Implementation of IP Authentication Module for Web based Embedded Network Module," Proceedings of the Korea Multimedia Society Spring Conference, 2008.
Hyeyoung Cho et al., "An Implementation of Network Intrusion Detection Engines on Network Processors," Journal of the Korean Institute of Information Scientists and Engineers, 2005.

*Primary Examiner* — Christopher Brown
(74) *Attorney, Agent, or Firm* — LRK Patent Law Firm

(57) ABSTRACT

A network security apparatus includes a management unit, a security policies monitoring unit, a security monitoring unit, a log security check unit, and a log transmission unit. The management unit receives network security apparatus setting information, security policies and log generation policies from the outside. The security policies monitoring unit checks whether the security policies comply with a set format. If the security policies comply with the set format, the security monitoring unit monitors whether a communication node communicates in compliance with the security policies. The log security check unit generates a monitoring log based on the log generation policies, and checks whether the monitoring log complies with a log setting format. If the monitoring log complies with the log setting format, the log transmission unit transmits the security log to the outside, thereby performing the outside network security.

11 Claims, 3 Drawing Sheets

(56) References Cited

U.S. PATENT DOCUMENTS

2008/0056487 A1* 3/2008 Akyol et al. .................. 380/2
2011/0131646 A1 6/2011 Park et al.
2012/0174221 A1 7/2012 Han

FOREIGN PATENT DOCUMENTS

| KR | 10-2008-0100618 A | 11/2008 |
| KR | 10-1036750 B1 | 5/2011 |
| KR | 10-2011-0061784 A | 6/2011 |

* cited by examiner

NETWORK SECURITY APPARATUS AND METHOD

CROSS-REFERENCE TO RELATED APPLICATION

This application claims the benefit of Korean Patent Application No. 10-2013-0055549, filed May 16, 2013, which is hereby incorporated by reference herein in its entirety.

BACKGROUND OF THE INVENTION

1. Technical Field

The present disclosure relates generally to a network security apparatus and method and, more particularly, to a network security apparatus and method that are capable of, without either using the resources of a communication node at the communication node corresponding to a monitoring target or generating additional traffic through a network over which the communication node corresponding to a monitoring target communicates, monitoring whether the communication node performs only communication complying with security policies and also performing remote management and the transmission of a related security log.

2. Description of the Related Art

Security software, such as an antivirus program and a personal firewall, is chiefly used to perform network security for a personal computer (PC) or a server. In this case, conventional security software is disadvantageous in that the running of the security software may exert a bad influence on the performance of a system to be protected or the security software may be stopped or infected by a computer virus or malware.

As an example, Korean Patent Application Publication No. 10-2011-0061784 entitled "Network Attack Defending Apparatus and Method, and Packet Transmission and Reception Processing Apparatus and Method including Same" discloses network security technology that is advantageous in that it can deal with strong attacks compared to methods using software and in that load is not exerted on a server because hardware determines whether a normal connection is set up and, thus, attacking packets from the outside are rarely transferred to a server.

However, the network security technology disclosed in Korean Patent Application Publication No. 10-2011-0061784 is disadvantageous in that traffic generated upon updating security software or transmitting a security log to a central server may act as load exerted on a network. Furthermore, the network security technology is problematic in that communication with the outside performed to update security software may be used as a path through which a computer virus or malware propagates.

SUMMARY OF THE INVENTION

Accordingly, at least one embodiment of the present invention is intended to provide a network security apparatus and method that are capable of, without either using the resources of a communication node at the communication node corresponding to a monitoring target or generating additional traffic through a network over which the communication node corresponding to a monitoring target communicates, monitoring whether the communication node performs only communication complying with security policies and also performing remote management and the transmission of a related security log.

In accordance with an aspect of the present invention, there is provided a network security method, including receiving, by a network security apparatus, network security apparatus setting information, security policies and log generation policies from the outside; checking whether the security policies comply with a set format; if the security policies comply with the set format, monitoring whether a communication node to which the network security apparatus has been applied communicates in compliance with the security policies; generating a monitoring log based on the log generation policies, and checking whether the monitoring log complies with a log setting format; and if the monitoring log complies with the log setting format, transmitting the security log generated based on the log generation policies to the outside, thereby performing network security.

Monitoring whether the communication node communicates in compliance with the security policies may include, if the communication node does not communicate in compliance with the security policies, blocking traffic based on the security policies.

Checking whether the security policies comply with the set format may include checking whether the security policies comply with the set format, and blocking malware propagation or infiltration from a security monitoring network to a communication node network via the security policies based on the results of the checking.

Checking whether the monitoring log complies with the log setting format may include checking whether the monitoring log complies with the log setting format, and blocking malware propagation or infiltration from a security monitoring network to a communication node network via the monitoring log based on the results of the checking.

Monitoring whether the communication node communicates in compliance with the security policies may include determining a port required for the communication with the communication node based on the network security apparatus setting information.

In accordance with another aspect of the present invention, there is provided a network security apparatus, including a management unit configured to receive network security apparatus setting information, security policies and log generation policies from the outside; a security policies monitoring unit configured to check whether the security policies comply with a set format; a security monitoring unit configured to, if the security policies comply with the set format, monitor whether a communication node to which the network security apparatus has been applied communicates in compliance with the security policies; a log security check unit configured to generate a monitoring log based on the log generation policies, and to check whether the monitoring log complies with a log setting format; and a log transmission unit configured to, if the monitoring log complies with the log setting format, transmit the security log generated based on the log generation policies to the outside, thereby performing the outside network security.

The security monitoring unit may block traffic based on the security policies if the communication node does not communicate in compliance with the security policies.

The security policies monitoring unit may check whether the security policies comply with the set format, and may block malware propagation or infiltration from a security monitoring network to a communication node network via the security policies based on the results of the checking.

The log security check unit may check whether the monitoring log complies with the log setting format, and may block malware propagation or infiltration from a security monitoring network to a communication node network via the monitoring log based on the results of the checking.

The security monitoring unit may determine a port required for the communication with the communication node based on the network security apparatus setting information.

The network security apparatus may further include three communication ports.

Two of the three communication ports may correspond to a communication port communicating with a security monitoring network, and a communication port communicating with a communication node network.

The remaining one of the three communication ports other than the two communication ports may correspond to a communication port communicating with an external local area network (LAN) card.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
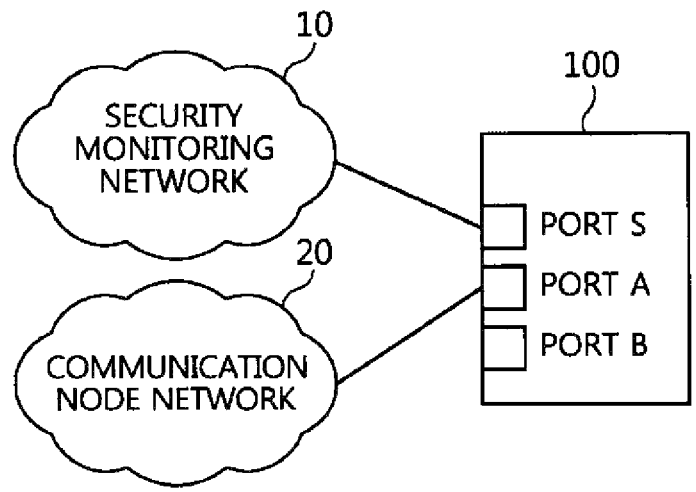
FIG. 1 is a diagram illustrating an environment in which a security function and the communication function of a communication node corresponding, to a monitoring target are performed via a network security apparatus according to an embodiment of the present invention.

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

A network security apparatus and method according to embodiments of the present invention are described in detail with reference to the accompanying drawings.

The present invention is directed to a network security apparatus and method that monitor whether a communication node performs only authorized communication in compliance with security policies enforced on the corresponding communication node and then prohibit unauthorized communication. In greater detail, the network security apparatus according to the present invention does not use the resources, such as a central processing unit (CPU), memory, etc., of a communication node, monitors whether a communication node performs only authorized communication, blocks unauthorized communication traffic, and may perform the function of a LAN card depending on set mode.

In particular, the network security apparatus provides a separate communication port, other than a communication port for the communication of a communication node, in order to transmit a security log, such as communication traffic monitoring and analysis information, and manage the network security apparatus. This enables traffic for the management of the network security apparatus to be transmitted over a network physically separate from a network, thereby preventing load from being imposed on the network to be monitored and also improving the security of the network security apparatus itself. In this case, the network security apparatus may be a junction between a network for a communication node and a security monitoring network, and includes the function of checking the security of a juncture section includes in order to prevent malware from propagating between these networks.

Furthermore, the network security apparatus may perform the function of a LAN card depending on settings. If a user desires to use an existing LAN card without change, a communication function is performed by the LAN card, and the network security apparatus according to an embodiment of the present invention performs only the monitoring of security and the generation of a security log.

Figure 2:
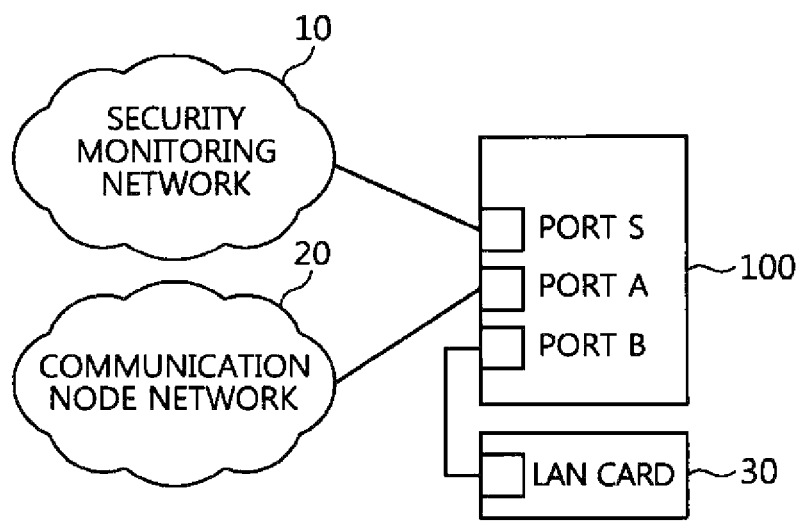
FIG. 2 is a diagram illustrating an environment in which only a security function is performed via a network security apparatus according to an embodiment of the present invention and the communication function of a communication node corresponding to a monitoring target is performed via the existing LAN card of the communication node.

FIG. 1 is a diagram illustrating an environment in which a security function and the communication function of a communication node corresponding to a monitoring target are performed via a network security apparatus according to an embodiment of the present invention. FIG. 2 is a diagram illustrating an environment in which only a security function is performed via a network security apparatus according to an embodiment of the present invention and the communication function of a communication node corresponding to a monitoring target is performed via the existing LAN card of the communication node.

First, the network security apparatus 100 may be installed at a communication node, and performs network security. Moreover, the network security apparatus 100 may be implemented as an independent hardware which is separated from the communication node. In accordance with the embodiments, the network security apparatus 100 may correspond to a plurality of communication nodes. In this case, the plurality of communication nodes may communicate with the network security apparatus 100 for network security.

The network security apparatus 100 includes three communication ports. In this case, the three communication ports are port S, port A, and port B.

Port S is used to remotely manage the network security apparatus 100 over a security monitoring network 10, or to transmit a security log generated by the network security apparatus 100 over the security monitoring network 10.

Port A is used by a communication node to connect to an external network, that is, a network for the communication node 20 (hereinafter also referred to as the "communication node network").

Referring to FIG. 1, the network security apparatus 100 may perform the function of a LAN card depending on settings. In this case, the network security apparatus 100 that performs the function of the LAN card enables a corresponding communication node to communicate with the outside via port A without using port B.

Referring to FIG. 2, when using the LAN card 30 without change, the network security apparatus 100 transfers traffic to the LAN card 30 via port B, thereby allowing the LAN card to perform a communication function. In this case, the network security apparatus 100 performs only a security monitoring function and a security log generation function.

Although there are conventional products that run antivirus engines on independent LAN cards, these products cannot perform security policies, other than virus monitoring, and white list-based abnormality monitoring.

In contrast, the network security apparatus 100 according to this embodiment of the present invention may perform the function of the LAN card, or may perform a security monitoring function while using an existing LAN card without change, depending on settings.

Next, the network security apparatus is described in detail with reference to FIG. 3.

Figure 3:
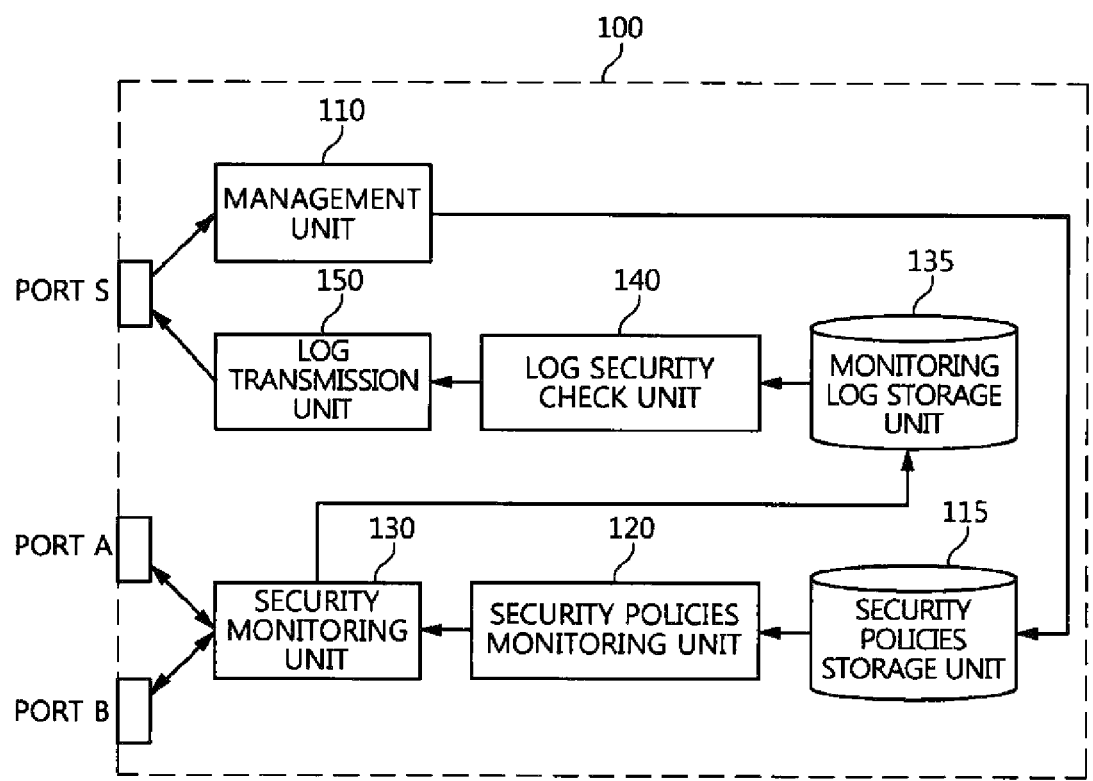
FIG. 3 is a diagram schematically illustrating the configuration of a network security apparatus according to an embodiment of the present invention.

FIG. 3 is a diagram schematically illustrating the configuration of a network security apparatus according to an embodiment of the present invention.

Referring to FIG. 3, the network security apparatus 100 includes a management unit 110, a security policies storage unit 115, a security policies monitoring unit 120, a security monitoring unit 130, a monitoring log storage unit 135, a log security check unit 140, and a log transmission unit 150. Furthermore, the network security apparatus 100 includes three communication ports (port S, port A, and port B), as described above.

The management unit 110 receives security information including network security apparatus setting information, security policies, and log generation policies from the outside via port S.

The security policies storage unit 115 stores the security policies of the security information received through the management unit 110.

The security policies monitoring unit 120 checks whether the security policies received through the management unit 110 comply with a set format.

Accordingly, the present invention can prevent malware propagation or infiltration from the security monitoring network 10 into the communication node network 20 via the security policies by checking whether the security policies comply with the set format.

The security monitoring unit 130 monitors whether a communication node to which the network security apparatus 100 has been applied communicates in compliance with the security policies. The security monitoring unit 130 blocks corresponding traffic based on the security policies if the communication node does not communicate in compliance with the security policies.

Furthermore, the security monitoring unit 130 generates log information in compliance with the log generation policies received from the outside by the management unit 110. In this case, the log information corresponds to information used to prevent malware propagation or infiltration into the security monitoring network, and also corresponds to a monitoring log.

Furthermore, the security monitoring unit 130 determines whether to use port B or a direct connection path to a communication node in order to communicate with the communication node based on the network security apparatus setting information received from the outside by the management unit 110.

The monitoring log storage unit 135 stores a monitoring log generated by the security monitoring unit 130.

The log security check unit 140 checks whether a monitoring log generated by the security monitoring unit 130 complies with a preset format, that is, a log setting format.

Accordingly, the present invention can prevent malware propagation or infiltration from the security monitoring network 10 into the communication node network 20 by checking whether the monitoring log complies with the log setting format.

The log transmission unit 150 generates a security log including traffic monitoring information and security monitoring results based on the log generation policies received from the outside by the management unit 110, and transmits the generated security log to the outside through port S. In this case, the log transmission unit 150 may perform network security by transmitting the generated security log to the outside.

The elements in the FIG. 3 may be installed into the communication node or be implemented independent of the communication node.

Next, a network security method is described in detail with reference to FIG. 4.

Figure 4:
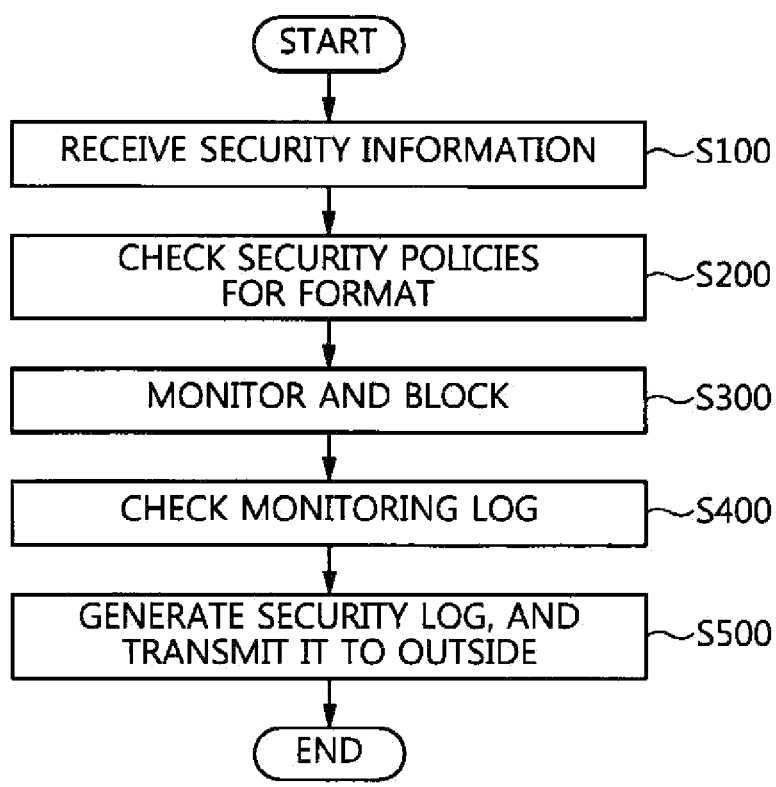
FIG. 4 is a flowchart illustrating a network security method according to an embodiment of the present invention.

FIG. 4 is a flowchart illustrating a network security method according to an embodiment of the present invention.

Referring to FIG. 4, the network security apparatus 100 receives security information including network security apparatus setting information, security policies and log generation policies from the outside step S100. At step S100, the network security apparatus 100 receives security information via port S.

The network security apparatus 100 checks whether the security policies of the security information received at step S100 comply with a set format at step S200. At step S200, the present invention can prevent malware propagation or infiltration from the security monitoring network 10 into the communication node network 20 via the security policies by checking whether the security policies comply with the set format.

The network security apparatus 100 monitors whether a communication node to which the network security apparatus 100 has been applied communicates in compliance with the security policies, and blocks corresponding traffic based on the security policies if the communication node does not communicate in compliance with the security policies at step S300. Furthermore, the network security apparatus 100 generates log information, that is, a monitoring log, based on the log generation policies of the security information received at step S100.

At step S400, the network security apparatus 100 checks whether a generated monitoring log complies with a log setting format based on the log generation policies of the security information received at step S100. At step S400, the present invention can prevent malware propagation or infiltration from the security monitoring network 10 into the communication node network 20 by checking whether the monitoring log complies with the log setting format.

At step S400, the network security apparatus 100 generates a security log including traffic monitoring information and security monitoring results based on the log generation policies received at step S100, and transmits the generated security log to the outside through port S. At step S400, the network security apparatus 100 may perform network security by transmitting the generated security log to the outside.

The network security apparatus and method according to embodiments of the present invention have the advantages of performing network security at a communication node corresponding to a monitoring target without using the resources of the communication node, and also performing network security without deteriorating the performance of a communication node that should be protected, such as a control system.

Furthermore, the network security apparatus and method according to embodiments of the present invention have the advantage of transmitting management and security logs over a separate network, other than a network that is used by communication nodes that are protected. This enables management without either using the resources of a communication node itself or imposing a load on the network of communication nodes. This can prevent malware propagation and infiltration between a network corresponding to a communication node and a security monitoring network.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A network security method comprising:
receiving, by a network security apparatus including three ports, including a security port and a communication port, network security apparatus setting information, security policies and log generation policies through the security port from a security monitoring network, wherein the network security apparatus is installed at a communication node to monitor security of the communication node, and the security port is connected to the security monitoring network while the communication port is connected to a communication node network for communication of the communication node, the security monitoring network being physically separated from the communication node network;
checking whether the security policies comply with a security policy setting format;
if the security policies comply with the security policy setting format, monitoring whether the communication node to which the network security apparatus has been applied communicates in compliance with the security policies;
generating a monitoring log based on the log generation policies, and checking whether the monitoring log complies with a log setting format; and
if the monitoring log complies with the log setting format, transmitting a security log generated based on the log generation policies through the security port to the security monitoring network, thereby performing network security,
wherein the monitoring of security of the communication node is not performed through the communication node network but through the security monitoring network, without either using resource of the communication node or imposing additional traffic on the communication node network.

2. The network security method of claim 1, wherein monitoring whether the communication node communicates in compliance with the security policies comprises, if the communication node does not communicate in compliance with the security policies, blocking traffic based on the security policies.

3. The network security method of claim 1, wherein checking whether the security policies comply with the security policy setting format comprises checking whether the security policies comply with the security policy setting format, and blocking malware propagation or infiltration from the security monitoring network to the communication node network via the security policies based on results of the checking.

4. The network security method of claim 1, wherein checking whether the monitoring log complies with the log setting format comprises checking whether the monitoring log complies with the log setting format, and blocking malware propagation or infiltration from the security monitoring network to the communication node network via the monitoring log based on results of the checking.

5. The network security method of claim 1, wherein monitoring whether the communication node communicates in compliance with the security policies comprises determining a port required for communication with the communication node based on the network security apparatus setting information.

6. A network security apparatus including a security port and a communication port, the network security apparatus comprising:
a manager which receives network security apparatus setting information, security policies and log generation policies through the security port from a security monitoring network;
a security policies monitor which checks whether the security policies comply with a security policy setting format;
a security monitor which, if the security policies comply with the security policy setting format, monitors whether a communication node to which the network security apparatus has been applied communicates in compliance with the security policies;
a log security checker which generates a monitoring log based on the log generation policies, and checks whether the monitoring log complies with a log setting format; and
a log transmitter which, if the monitoring log complies with the log setting format, transmits a security log generated based on the log generation policies through the security port to the security monitoring network, thereby performing network security,
wherein the network security apparatus is installed at the communication node to monitor security of the communication node,
wherein the monitoring of security of the communication node is not performed through a communication node network but through the security monitoring network, without either using resources of the communication node or imposing additional traffic on the communication node network,
wherein the security port is connected to the security monitoring network, and the communication port is connected to the communication node network, and wherein the security monitoring network is physically separated from the communication node network,
wherein the network security apparatus further comprises three ports,
wherein two of the three ports correspond to a port communicating with the security monitoring network, and a port communicating with the communication node network.

7. The network security apparatus of claim 6, wherein the security monitor blocks traffic based on the security policies if the communication node does not communicate in compliance with the security policies.

8. The network security apparatus of claim 6, wherein the security policies monitor checks whether the security policies comply with the security policy setting format, and blocks malware propagation or infiltration from the security monitoring network to the communication node network via the security policies based on results of the checking.

9. The network security apparatus of claim 6, wherein the log security checker checks whether the monitoring log complies with the log setting format, and blocks malware propagation or infiltration from the security monitoring network to the communication node network via the monitoring log based on results of the checking.

10. The network security apparatus of claim 6, wherein the security monitor determines a port required for communication with the communication node based on the network security apparatus setting information.

11. The network security apparatus of claim 6, wherein a remaining one of the three ports corresponds to a port communicating with an external local area network (LAN) card.

* * * * *